US006685169B2

United States Patent
Shim

(10) Patent No.: US 6,685,169 B2
(45) Date of Patent: Feb. 3, 2004

(54) MOTOR OPERATED JACK FOR VEHICLES

(76) Inventor: Jong-Uk Shim, Daechi Apt 216 Dong, 304 Ho, No 12, Gaepo-dong, Gangnam-gu, Seoul (KR)

( * ) Notice: Subject to any disclaimer, the term of this patent is extended or adjusted under 35 U.S.C. 154(b) by 0 days.

(21) Appl. No.: 10/150,896

(22) Filed: May 17, 2002

(65) Prior Publication Data

US 2002/0171070 A1 Nov. 21, 2002

(30) Foreign Application Priority Data

May 18, 2001 (KR) .................................. 2001-0027133

(51) Int. Cl.[7] ................................................. B66F 3/18
(52) U.S. Cl. ......................... 254/103; 254/102; 254/98; 254/DIG. 4
(58) Field of Search ................................. 254/102, 103, 254/98, DIG. 2, DIG. 4, 100, 7 R, 3 R, DIG. 1, 101; 248/329, 161, 408; 362/147, 403, 405, 386

(56) References Cited

U.S. PATENT DOCUMENTS 1,840,627 A * 1/1932 Hott ........................... 254/103
5,118,082 A * 6/1992 Byun .......................... 254/102
5,123,629 A * 6/1992 Takeuchi ..................... 254/103
5,992,826 A * 11/1999 Simmonds ................... 254/103

* cited by examiner

Primary Examiner—Joseph J. Hail, III
Assistant Examiner—Daniel Shanley
(74) Attorney, Agent, or Firm—Harrison & Egbert

(57) ABSTRACT

A motor-operated jack for vehicles includes a lifting unit, which includes a spiral lifting ram having an internal thread limitedly formed at a lower portion of the spiral lifting ram, and a pin held in a horizontal groove formed at the top end of a primary screw. This pin is slightly projected into two longitudinal holes symmetrically formed at the top portion of a secondary screw. There is also a coil spring, a spring cover and a snap ring sequentially laid on the top of the pin. There is also a support ram, having a top support and an external thread, movably fitted in a gap between the secondary screw and the spiral lifting ram while engaging with an internal thread of the spiral lifting ram at the external thread, thus allowing a user to control the moving stroke of the lifting unit as desired.

1 Claim, 5 Drawing Sheets

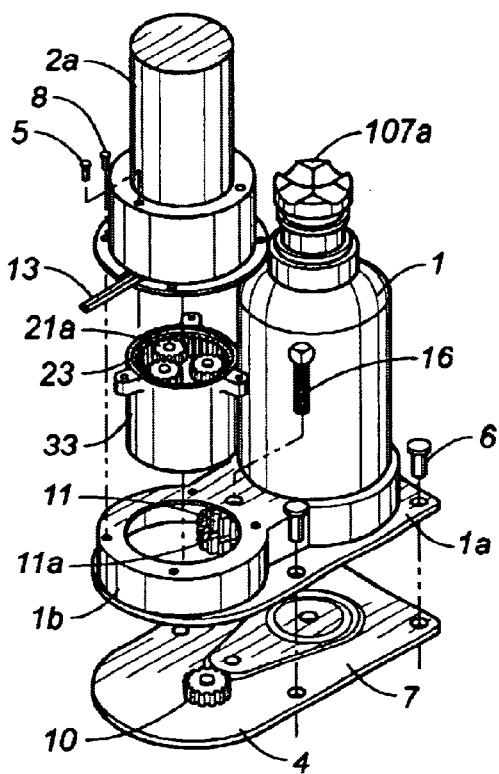
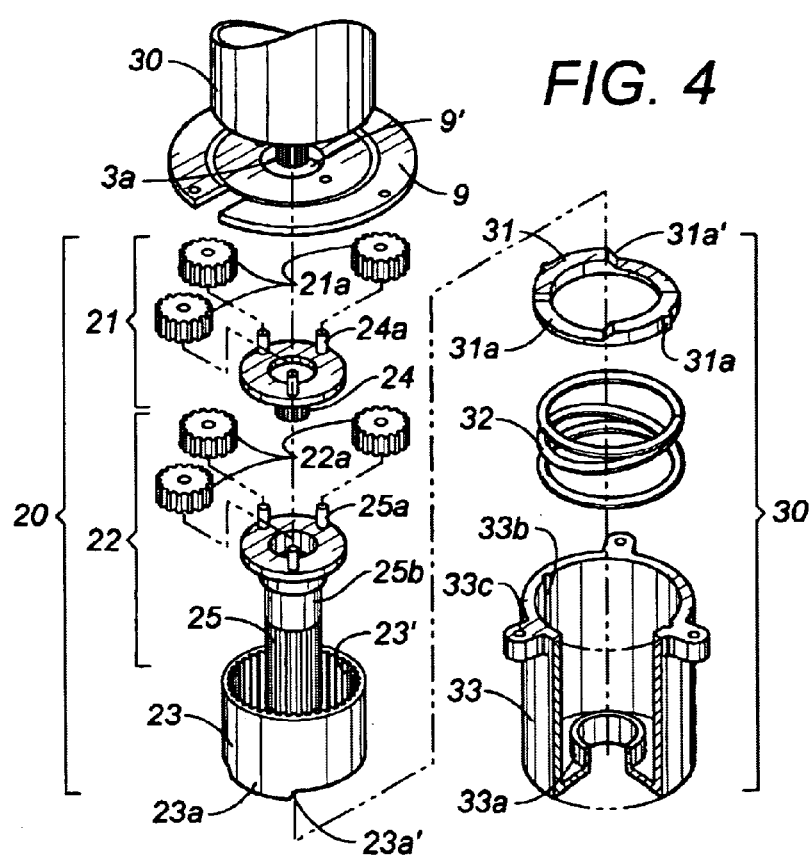

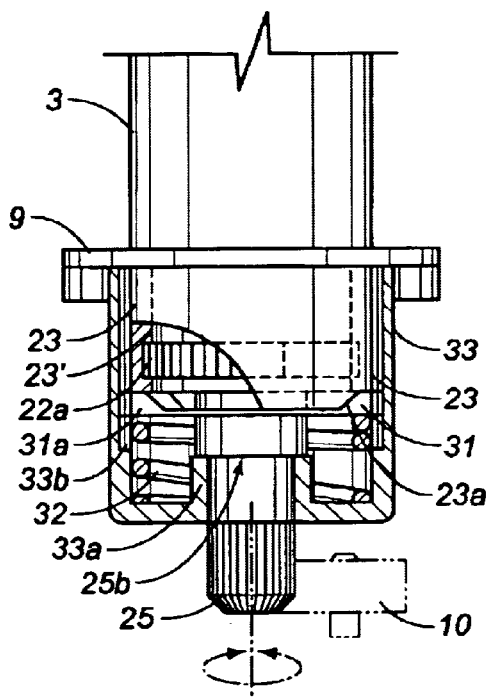
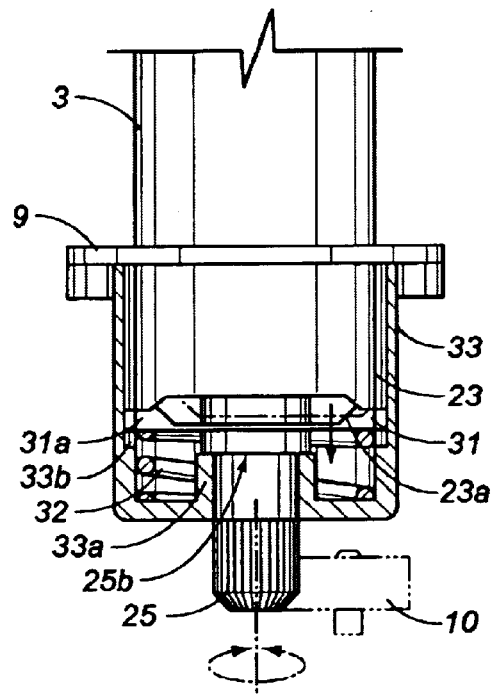
FIG. 5a            FIG. 5b
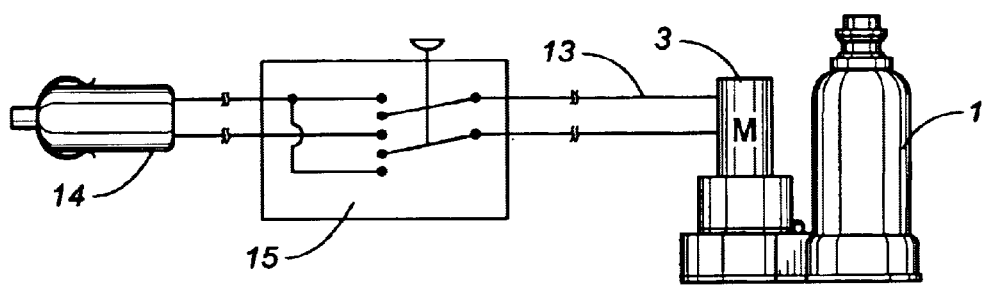
FIG. 6

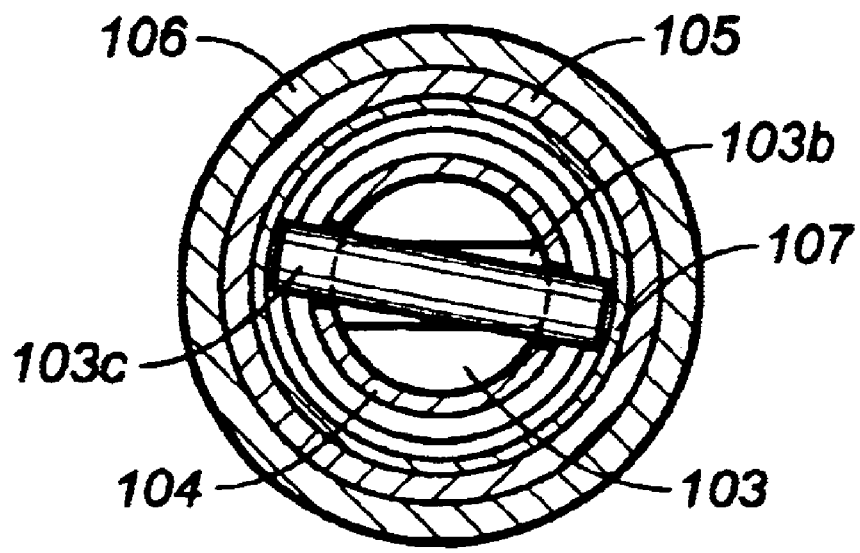
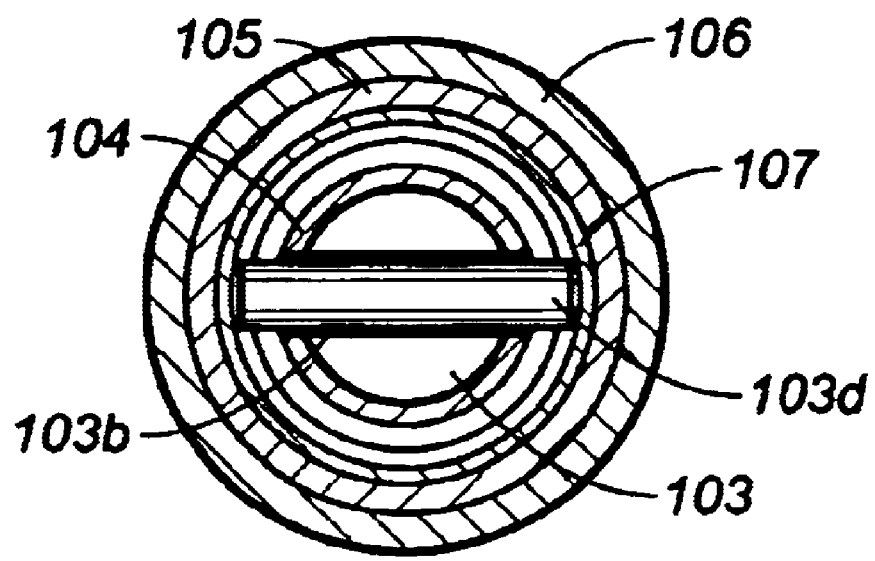
FIG. 7b

MOTOR OPERATED JACK FOR VEHICLES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to motor-operated jacks for raising or lifting vehicles to desired heights and, more particularly, to a motor-operated jack consisting of a power transmission unit and a lifting unit, and designed to reduce an undesired power consumption due to the frictional resistance formed at the junction of the engaging threads of the lifting unit, and have a means for reliably making the spiral lifting ram be lifted prior to the secondary screw during an operation of the jack, and have a means for allowing a user to control the moving stroke of the lifting unit as desired.

BACKGROUND OF THE INVENTION

In the prior art, jacks used for raising or lifting the vehicles are classified into several types: screw-type jacks, rack-type jacks, pneumatic or hydraulic jacks, and motor-operated jacks. In recent years, several types of motor-operated jacks have been proposed and widely used. One example of such conventional motor-operated jacks is referred to U.S. Pat. No. 4,609,179.

The construction of the motor-operated jack disclosed in the above U.S. patent document is shown in FIG. 1. As shown in the drawing, the jack is designed such that the output power of a drive motor b is transmitted to the lifting ram 1 through a plurality of power transmission gears d and e so as to move the ram 1 in a vertical direction. However, the output power of the drive motor b is not sufficient to effectively raise or lift a heavy vehicle, and so an unexpected breakage of the drive motor or the power transmission gears may occur during an operation of the jack. Such an unexpected breakage of the drive motor or the power-transmission gears may cause safety hazards while raising or lifting a vehicle. In addition, it is almost impossible to move the ram of the above motor-operated jack using the electric power of a vehicle.

Another example of conventional motor-operated jacks may be referred to Korean U.M. Publication No. 92-5683. This motor-operated jack is designed such that a safety unit, in addition to a reduction gear unit having two sets of planetary gears, is provided at the output side of a drive motor, and is somewhat smoothly operable by electricity supplied from the cigar lighter provided on the dashboard. Since the jack has the safety unit, it is possible to almost completely prevent unexpected occurrence of safety hazards caused by overload during an operation of the jack. Therefore, this jack does not have any problem in its power transmission unit. However, this jack is problematic in its lifting unit as follows.

First, as shown in FIG. 2, the above jack undesirably consumes excessive power due to frictional resistance produced by the first engagement of the external thread 103a of the primary screw 103 with the internal thread 104a of the secondary screw 104 and the second engagement of the external thread 104b of the secondary screw 104 with the internal thread 105a of the spiral lifting ram 105.

Second, the secondary screw 104 may be undesirably raised along with the spiral lifting ram 105 at the same time during a rotating action of the primary screw 103 even though the spiral lifting ram 105 is needed to be lifted prior to the secondary screw 104 during such a rotating action of the primary screw 103. Furthermore, the secondary screw 104 and the spiral lifting ram 105 are undesirably raised at the same time during such a rotating action of the primary screw 103 when the frictional resistance produced at the junction of the external thread 104b of the secondary screw 104 and the internal thread 105a of the spiral lifting ram 105 is higher than that of the junction of the external thread 103a of the primary screw 103 with the internal thread 104a of the secondary screw 104. Particularly when the secondary screw 104 is undesirably raised along with the spiral lifting ram 105 at the same time during such a rotating action of the primary screw 103, only the primary screw 103 is left at the lower portion of the jack to bear the load applied from the vehicle to the jack. In such a case, the primary screw 103 may be broken due to overload, and causes safety hazards during the operation of the jack.

Third, the jack is designed to raise or lift a vehicle, and so the jack is inevitably limited in the length of the lifting ram in an effort to accomplish the compactness of the jack. It is sometimes necessary for the jacks to lift a vehicle to a great height. However, the above jack does not have any means for allowing a user to control the moving stroke of the lifting unit as desired, and so the jack cannot raise or lift a vehicle to a desired great height when necessary.

BRIEF SUMMARY OF THE INVENTION

Accordingly, the present invention has been made keeping in mind the above problems occurring in the prior art, and an object of the present invention is to provide a motor-operated jack for vehicles, which is designed to reduce an undesired power consumption due to the frictional resistance formed at the junction of the engaging threads of the lifting unit, and having a means for reliably making the spiral lifting ram be lifted prior to the secondary screw during an operation of the jack, and have a means for allowing a user to control the moving stroke of the lifting unit as desired.

In order to accomplish the above object, the present invention provides a motor-operated jack for vehicles, comprising a lifting unit consisting of: a spiral lifting ram having an internal thread limitedly formed at a lower portion of the spiral lifting ram, thus reducing its frictional resistance; a pin held in a horizontal groove formed at the top end of a primary screw, the pin being slightly projected into two longitudinal holes symmetrically formed at the top portion of a secondary screw; a coil spring, a spring cover and a snap ring sequentially laid on the top of the pin such that the snap ring is seated in an annular groove formed on the inner surface of the top wall of the secondary screw, thus allowing the coil spring to bias the pin, the second screw being thus prevented from being raised along with the spiral lifting ram; and a support ram having a top support and an external thread, and movably fitted in a gap between the secondary screw and the spiral lifting ram while engaging with an internal thread of the spiral lifting ram at the external thread, thus allowing a user to control the moving stroke of the lifting unit.

BRIEF DESCRIPTION OF THE SEVERAL VIEWS OF THE DRAWINGS

The above and other objects, features and other advantages of the present invention will be more clearly understood from the following detailed description taken in conjunction with the accompanying drawings.

FIG. 3 is an exploded perspective view of a motor-operated jack in accordance with the preferred embodiment of the present invention.

FIG. 4 is an exploded perspective view of a power transmission unit included in the motor-operated jack of this invention.

FIGS. 5a and 5b are front plan views of the power transmission unit included in the motor-operated jack of this invention, showing the operation of the power transmission unit, wherein FIG. 5a shows the power transmission unit before operation; and FIG. 5b shows the power transmission unit after operation.

FIG. 6 is a schematic illustration showing an electric circuit used in the motor-operated jack of this invention.

FIGS. 7a and 7b are sectional views of a lifting unit included in the motor-operated jack of this invention, wherein FIG. 7a is a vertical sectional view of the lifting unit; and FIG. 7b is a transverse sectional view of the lifting unit.

DETAILED DESCRIPTION OF THE INVENTION

Figure 1:
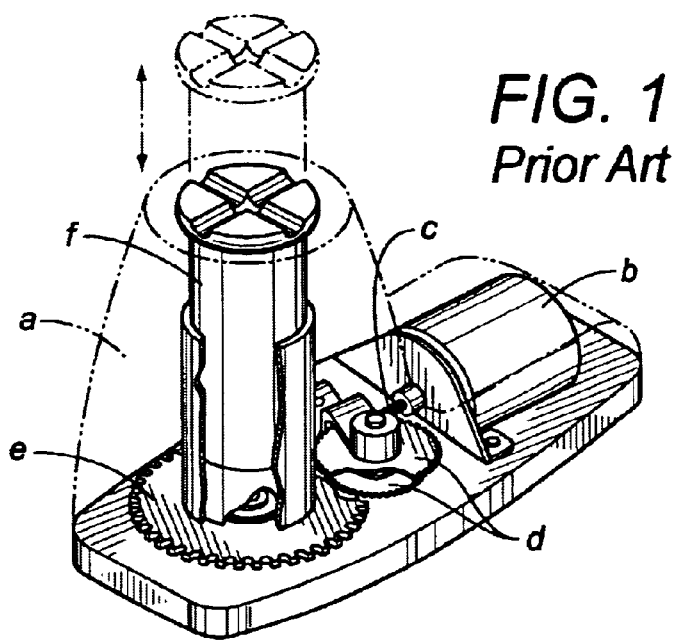
FIG. 1 is a perspective view of a motor-operated jack in accordance with an embodiment of the prior art.
Figure 2:
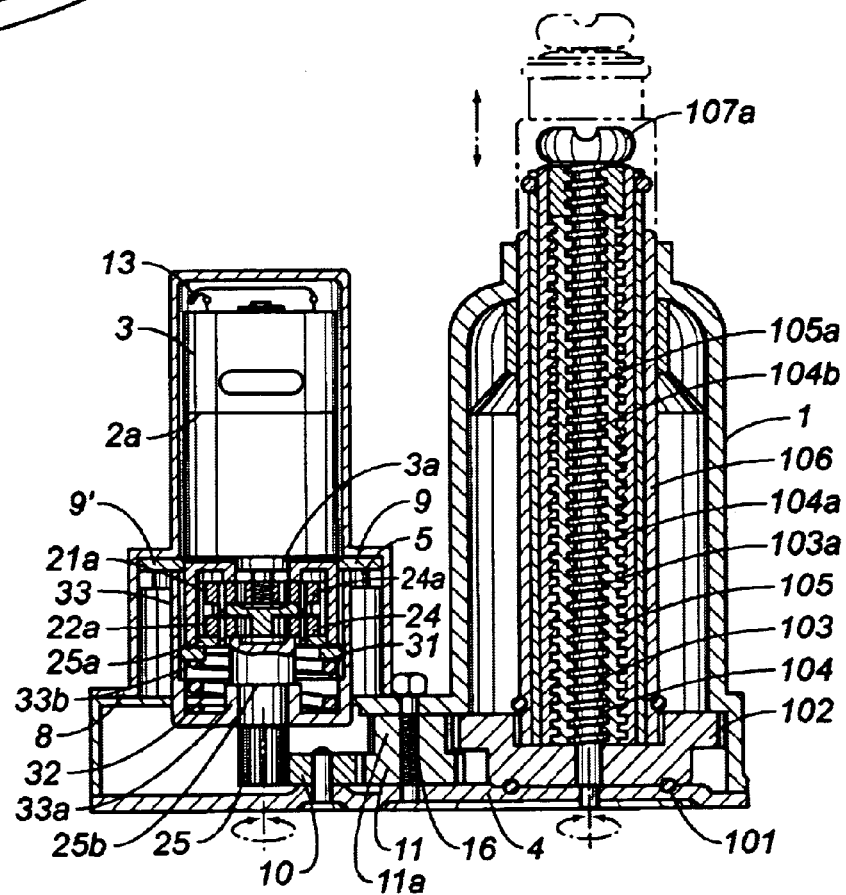
FIG. 2 is a sectional view of a motor-operated jack in accordance with another embodiment of the prior art.

Reference now should be made to the drawings, in which the same reference numerals are used throughout the different drawings to designate the same or similar components.

FIG. 3 is an exploded perspective view of a motor-operated jack in accordance with the preferred embodiment of the present invention. As shown in the drawing, the jack of this invention has an integral body. This integral body includes a lifting unit casing 1 having a base flange 1a at its lower end. The lifting unit casing 1 houses a lifting unit therein. A power transmission unit is housed within the lower portion of the lifting unit casing 1. An annular casing 1b is formed at a side of the lower portion of the lifting unit casing 1 such that the annular casing 1b is integrated with the lifting unit casing 1 into a single structure. A base plate 4 is mounted to the base flange 1a, thus sealing the bottom of the jack. A motor casing 2a, having a stepped cylindrical shape, is vertically held in the annular casing 1b such that the large diameter lower portion of the motor casing 2a is set within the annular casing 1b and the small diameter upper portion of the casing 2a vertically projects upward outside the annular casing 1b. A drive motor 3 is set within the small diameter upper portion of the motor casing 2a, while a planetary gear casing 2 is set within the large diameter lower portion of the motor casing 2a.

The power transmission unit includes a reduction gear unit 20, which consists of first and second planetary gear sets commonly operated in conjunction with the output shaft of the drive motor 3. This power transmission unit also has a safety unit 30, which is automatically operated when the motor 3 is undesirably overloaded.

In a detailed description, both the reduction gear unit 20 and the safety unit 30 are housed in a cylindrical case 33. The cylindrical case 33 is mounted to the annular step wall 9, formed at the middle portion of the motor casing 2a, by means of a plurality of locking screws 8. As shown in FIG. 4, the reduction gear unit 20 comprises the first and second planetary gear sets 21 and 22, and an internal gear cylinder 23 commonly engaging with the two planetary gear sets 21 and 22.

The first planetary gear set 21 comprises a sun gear 24 and a plurality of upper planetary gears 21a. The upper planetary gears 21a are fitted over the gear pins 24a of the sun gear 24, and commonly engage with the motor gear 3a passing through the central opening 91 of the annular step wall 9. The second planetary gear set 22 comprises a drive pinion 25 and a plurality of lower planetary gears 22a. The lower planetary gears 22a are fitted over the gear pins 25a of the drive pinion 25, and commonly engage with the sun gear 24 of the first planetary gear set 21. The internal gear cylinder 23 is opened at its top and bottom, and is threaded on its inner surface, thus forming an internal gear 231 engaging with the upper and lower planetary gears 21a and 22a of the two planetary gear sets 21 and 22. The lower edge of the internal gear cylinder 23 is provided with two shoulders 23a at diametrically opposite portions for engaging with a clutch disc 31 of the safety unit 30 as will be described herein later. An inclined surface 23a' is formed at each end of the shoulders 23a.

As shown in FIG. 4, the safety unit 30 comprises the clutch disc 31 and a clutch spring 32, which are housed in a casing.

The clutch disc 31 is an annular member with a central opening. Two depressions 31a are formed on the top surface of the clutch disc 31 at diametrically opposite positions, and engage with the two shoulders 23a of the internal gear cylinder 23. Two projections 31b are formed on the sidewall of the disc 31 at diametrically opposite positions angularly spaced apart from the two depressions 31a at right angles. An inclined surface 31a' is formed at each end of the two depressions 31a.

The clutch spring 32 normally biases the clutch disc 31 so as to maintain the engagement of the two depressions 31a of the clutch disc 31 with the two shoulders 23a of the internal gear cylinder 23. This clutch spring 32 also allows the two depressions 31a to be removed from the two shoulders 23a.

The cylindrical case 33 houses both the reduction gear unit 20 and the safety unit 30. A sleeve 33a is provided at the center of the bottom wall of the case 33. The drive pinion 25 of the reduction gear unit 20 is vertically inserted into the opening of the sleeve 33a. In such a case, this drive pinion 25 has an annular step 25b at its middle portion, and is seated on the top edge of the sleeve 33a at the annular step 25b. Two vertical grooves 33b are formed on the inner surface of the case 33 at diametrically opposite positions, and movably engage with the two projections 31b of the clutch disc 31. A plurality of brackets 33c, each having a mounting hole, are regularly formed along the top edge of the case 33, and so the case 33 is mounted to the annular step wall 9 of the motor casing 2a by means of the locking screws 8.

Both a middle gear 10 and a driven gear 11 are provided on the base plate 4. The middle gear 10 engages with the drive pinion 25, while the driven gear 11 engages with the middle gear 10. A driven pinion 11a is integrally and concentrically formed at the shaft of the driven gear 11. The driven pinion 11a engages with a primary screw actuating gear 102 provided at the lower portion of the lifting unit, thus rotating the primary screw actuating gear 102 in opposite directions in accordance with opposite directional rotating action of the drive motor 3.

Figure 7A:
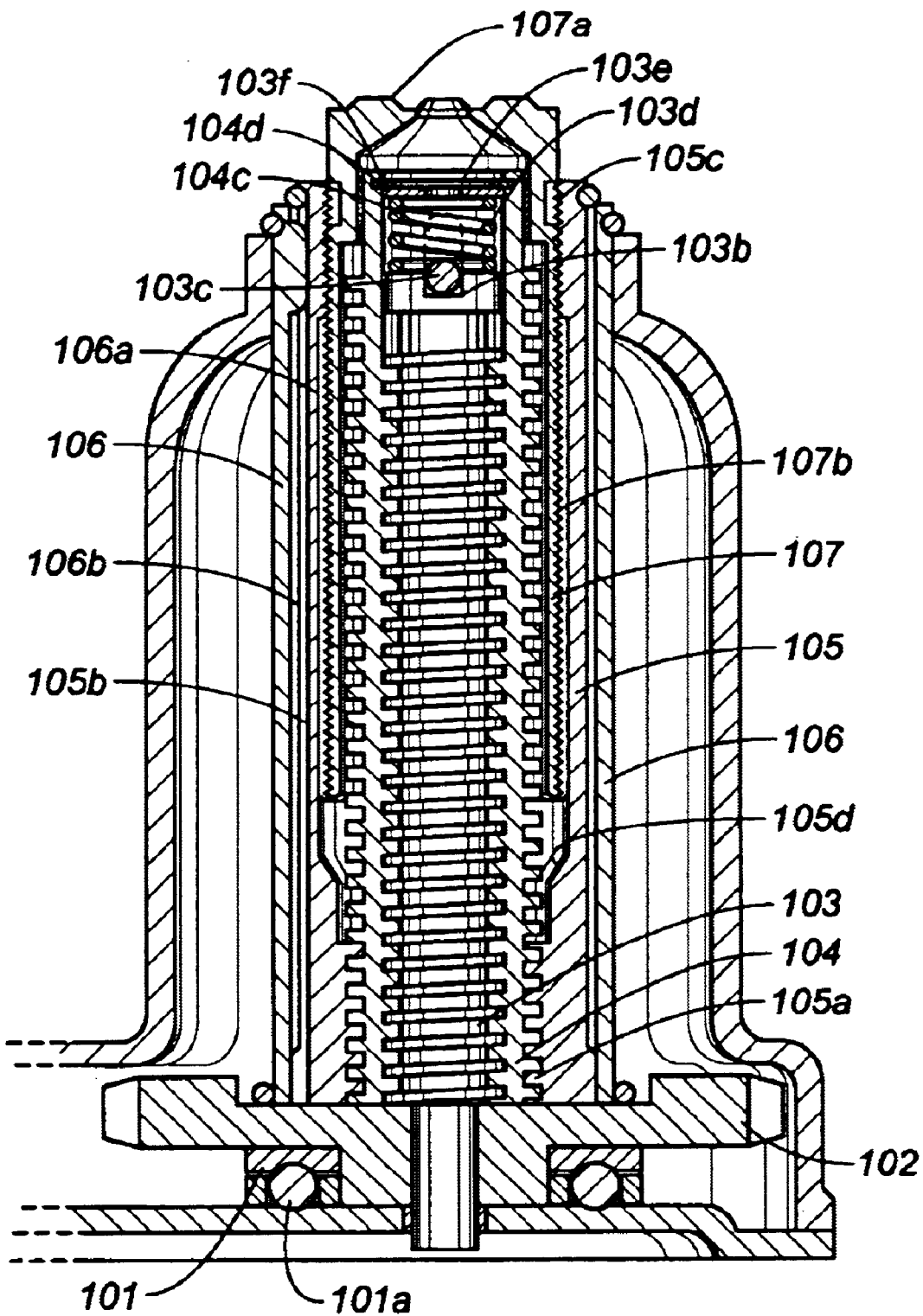

As shown in FIG. 7, the lifting unit includes the primary screw actuating gear 102, which is seated on a disc 101 supported by a ball bearing 101a and engages with the driven pinion 11a. A primary screw 103 is vertically fixed to the center of the actuating gear 102 at its lower end. The lifting unit also has a secondary screw 104, which has an internal thread 104a engaging with the external thread 103a of the primary screw 103. The lifting unit further includes a spiral lifting ram 105. This lifting ram 105 has an internal thread 105a at its lower portion such that the internal thread 105a engages with the external thread 104b of the secondary screw 104. Two or more vertical guide grooves 105b are regularly formed on the outer surface of the lifting ram 105. A fixed ram 106 is fitted over the lifting ram 105. Two or more projections 106a are regularly formed on the upper portion of the inner surface of the fixed ram 106, and engage with the vertical guide grooves 105b of the lifting ram 105. Therefore, a vertical linear movement of the lifting ram 105 relative to the fixed ram 106 is allowed, but a rotating action of the lifting ram 105 within the fixed ram 106 is prevented.

The jack of this invention also has a support ram 107. This support ram 107 has a top support 107a and an external thread 107b, and is movably fitted in the gap between the secondary screw 104 and the spiral lifting ram 105 while engaging with an internal thread 105c of the spiral lifting ram 105 at its external thread 107b. The support ram 107 is manually movable upward or downward in a vertical direction.

A pin 103c is held in a horizontal groove 103b formed at the top end of the primary screw 103, and is slightly projected into two longitudinal holes 104c, which are symmetrically formed at the top portion of the secondary screw 104. A coil spring 103d, a spring cover 103e and a snap ring 103f are sequentially laid on the top of the pin 103c. In such a case, the snap ring 103f is seated in an annular groove 104d formed on the inner surface of the top wall of the secondary screw 104, thus allowing the coil spring 103d to bias the pin 103c.

In order to electrically operate the motor-operated jack including the power transmission unit and the lifting unit as described above, an electric cord 13 extending from the drive motor 3 of the jack is connected to the cigar lighter of the vehicle as shown in the electric circuit diagram of FIG. 6. When a control switch 15 is operated, the motor 3 is rotated in either direction. The rotating force of the motor 3 is primarily transmitted to the primary screw 103 through the primary screw actuating gear 102, thus rotating the primary screw 103 in a direction to move the lifting ram upward or downward in a vertical direction.

The operational effect of the motor-operated jack of this invention will be described in detail herein below with reference to FIG. 5.

When it is desired to lift a vehicle, the jack is primarily laid on a support surface at a position under a desired portion of the vehicle. Thereafter, the control switch 15 is operated to start a lifting mode operation, and so the motor 3 is rotated in a forward direction. The motor gear 3a of the drive motor 3 is rotated in the same direction along with the upper planetary gears 21a.

In such a case, the two shoulders 23a of the internal gear cylinder 23 internally engaging with the upper planetary gears 21a engage with the two depressions 31a formed on the top surface of the clutch disc 31. In addition, the two projections 31b formed on the sidewall of the clutch disc 31 engage with the two vertical grooves 33b formed on the inner surface of the case 33. Therefore, the internal gear cylinder 23 is prevented from being rotated, and so the sun gear 24 engaging with the upper planetary gears 21a is rotated along with the planetary gears 21a. Since the lower planetary gears 22a engage with the sun gear 24, the planetary gears 22a are rotated by the rotating force of the sun gear 24. Due to the rotating action of the lower planetary gears 22a, the drive pinion 25 is rotated while reducing the rotating speed since the pinion 25 engages with the lower planetary gears 22a.

Due to the rotating action of the drive pinion 25, the middle gear 10 and the driven gear 11 are rotated. Therefore, the driven pinion 11 a, concentrically integrated with the shaft of the driven gear 11, rotates the primary screw actuating gear 102 in the forward direction. The primary screw 103, integrated with the center of the actuating gear 102, is thus rotated in the same direction as that of the gear 102. In such a case, the pin 103c held in the horizontal groove 103b of the primary screw 103 is slightly projected into the two longitudinal holes 104c, thus preventing a rotating action of the secondary screw 104. Therefore, only the spiral lifting ram 105 is lifted. In such a case, the upward movement of the lifting ram 105 is stopped when the upper end of the internal thread of the lifting ram 10S is aligned with the terminal point of the external thread of the secondary screw 104. Such an upward movement of the lifting ram 105 accomplishes a primary lifting action of the lifting unit.

Thereafter, the lifting unit performs a secondary lifting action. That is, when the lifting ram 105 is primarily lifted as described above, it raises the pin 103c and removes the pin 103c from the horizontal groove 103b, and allows the pin 103c to be held in a narrow portion 105d of the spiral lifting ram 105. Therefore, the secondary screw 104 is released from the primary screw 103, and so the secondary screw 104 is lifted in the vertical direction by the continued rotating action of the primary screw 103, thus accomplishing the secondary lifting action.

During such a secondary lifting action of the lifting unit, the moving stroke of the secondary screw 104 is determined by the gap between the lower end of the longitudinal groove of the spiral lifting ram and the internal projection of the fixed ram.

In a brief description, the motor-operated jack of this invention is designed such that it lifts a vehicle to a desired height in a normal situation by the primary lifting action forming a total lifted distance calculated by an addition of the length of the manually operated support ram and the lifted height of the spiral lifting ram. However, when it is desired to further raise a vehicle in height, the secondary lifting action, in addition to the primary lifting action, is carried out by the secondary screw.

In the present invention, the jack is designed such that the secondary lifting action is performed with only a part of the entire length of the secondary screw. This is to reinforce the strength of the primary screw by the secondary screw, in addition to accomplishing the compactness of the jack.

When it is desired to lower a vehicle, the control switch 15 is operated to start a lowering mode operation, and so the motor 3 is rotated in a reverse direction. The motor gear 3a is thus rotated in the same direction along with the upper planetary gears 21a. Therefore, the upper and lower planetary gears 21a and 22a, the drive pinion 25, the middle gear 10, the driven gear 11 and the driven pinion 11a are rotated in the reverse direction. The driven pinion 11 a thus rotates the primary screw actuating gear 102 in the reverse direction. During such a reverse rotation of the actuating gear 102, the secondary screw 104 is primarily lowered to come into contact with the top surface of the actuating gear 102. Thereafter, the spiral lifting ram is secondarily lowered, and moves the pin 103c from the narrow portion 105d of the spiral lifting ram 105 onto the top of the primary screw 103. When the spiral lifting ram 105 is further rotated and lowered, it lays the pin 103c in the horizontal groove 103b since the coil spring biases the pin 103c. The lowering action of the lifting ram 105 is stopped when the lower end of the ram 105 comes into contact with the top surface of the primary screw actuating gear 102.

In the motor-operated jack for vehicles according to the present invention, the construction of the power transmission unit remains the same as that of a conventional motor-operated jack. However, the lifting unit is altered such that the internal thread of the spiral lifting ram is limitedly formed at the lower portion of the ram, different from the conventional jack. Therefore, the jack of this invention remarkably reduces the frictional resistance formed at the spiral lifting ram. In addition, the pin 103c is held in the horizontal groove 103b formed at the top end of the primary screw 103, and is slightly projected into two longitudinal holes 104c, which are symmetrically formed at the top portion of the secondary screw 104. The coil spring 103d, spring cover 103e and snap ring 103f are sequentially laid on the top of the pin 103c. In such a case, the snap ring 103f is seated in the annular groove 104d formed on the inner surface of the top wall of the secondary screw 104, thus allowing the coil spring 103d to bias the pin 103c. Therefore, during an operation of the jack of this invention, the second screw 104 is prevented from being raised along with the spiral lifting ram 105.

The jack of this invention also has the support ram 107. This support ram 107 has the top support 107a and the external thread 107b, and is movably fitted in the gap between the secondary screw 104 and the spiral lifting ram 105 while engaging with the internal thread 105c of the spiral lifting ram 105 at its external thread 107b. The support ram 107 is manually movable upward or downward in a vertical direction. Therefore, a user is allowed to control the moving stroke of the lifting unit as desired.

As described above, the present invention provides a motor-operated jack for vehicles. The lifting unit of this jack is altered such that the internal thread of the spiral lifting ram is limitedly formed at the lower portion of the ram, different from the conventional jack. Therefore, this jack remarkably reduces the frictional resistance formed at the spiral lifting ram, and reduces load applied to the lifting ram. In addition, the second screw of the lifting unit is prevented from being raised along with the spiral lifting ram, and so the jack accomplishes desired operational safety. This jack also has a support ram, which has an external thread engaging with an internal thread formed at the upper portion of the spiral lifting ram. Therefore, the jack of this invention accomplishes the recent trend of compactness, and allows a user to control the moving stroke of the lifting unit as desired.

Although a preferred embodiment of the present invention has been described for illustrative purposes, those skilled in the art will appreciate that various modifications, additions and substitutions are possible, without departing from the scope and spirit of the invention as disclosed in the accompanying claims.

I claim:

1. A lifting unit for a motor-operated jack for vehicles comprising:

a spiral lifting ram having a length and a top end and a lower end, said spiral lifting ram having an internal thread formed therein and extending upwardly from said lower end for less than one-half of said length of said spiral lifting ram;

a primary screw extending interior of said spiral lifting ram, said primary screw having a horizontal groove formed in a top end of said primary screw;

a secondary screw threadedly interposed between said spiral lifting ram and said primary screw, said secondary screw having a pair of longitudinal holes symmetrically formed at a top portion thereof, said secondary screw having an annular groove formed on a top wall thereof;

a pin received in said horizontal groove of said primary screw, said pin slightly projecting into said pair of longitudinal holes of said secondary screw;

a coil spring;

a spring cover;

a snap ring, said coil spring and said spring cover and said snap ring being sequentially laid on top of said pin such that said snap ring is seated in said annular groove of said secondary screw, said coil spring biasing said pin such that said secondary screw is prevented from being raised with said spiral lifting ram; and a support ram having a top surface and an external thread, said support ram movably fitted in a gap between said secondary screw and said spiral lifting ram so as to engage another internal thread of said spiral lifting ram at said external thread so as to allow a user to control a moving stroke of the lifting unit.

* * * * *